United States Patent
Kang et al.

(10) Patent No.: US 11,386,188 B2
(45) Date of Patent: Jul. 12, 2022

(54) METHOD AND SYSTEM FOR RECOGNIZING INPUT USING INDEX OF VARIABLE GRID

(71) Applicant: NAVER CLOUD CORPORATION, Seongnam-si (KR)

(72) Inventors: Jungmin Kang, Seongnam-si (KR); Tae Gyu Kang, Seongnam-si (KR); Sechun Oh, Seongnam-si (KR); Ho Jin Lee, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 52 days.

(21) Appl. No.: 16/927,090

(22) Filed: Jul. 13, 2020

(65) Prior Publication Data

US 2020/0342077 A1  Oct. 29, 2020

Related U.S. Application Data

(63) Continuation of application No. 16/124,929, filed on Sep. 7, 2018, now Pat. No. 10,754,937, which is a (Continued)

(30) Foreign Application Priority Data

Mar. 8, 2016  (KR) .................. 10-2016-0027629

(51) Int. Cl.
*G06F 21/31* (2013.01)
*G06F 21/45* (2013.01)
(Continued)

(52) U.S. Cl.
CPC .............. *G06F 21/316* (2013.01); *G06F 3/01* (2013.01); *G06F 3/04883* (2013.01);
(Continued)

(58) Field of Classification Search
CPC .... G06F 3/04886; G06F 21/316; G06F 21/45; G06F 3/03547; G06F 21/36
See application file for complete search history.

(56) References Cited

U.S. PATENT DOCUMENTS

2004/0104896 A1*  6/2004  Suraqui ................. G06F 3/0237
                                                        345/168
2010/0231505 A1*  9/2010  Iwata ................... G06F 3/04886
                                                        345/156

(Continued)

FOREIGN PATENT DOCUMENTS

JP        2009509235 A     3/2009
KR    1020060043083 A     5/2006

(Continued)

OTHER PUBLICATIONS

Int'l. Search Report issued in Int'l. App. No. PCT/KR2017/001995, dated May 23, 2017.

*Primary Examiner* — Dao Q Ho
(74) *Attorney, Agent, or Firm* — Greer Burns & Crain Ltd.

(57) ABSTRACT

An input recognition method carried out by an electronic device implemented by a computer comprises the steps of generating a virtual grid of which the distance between lines is variable, in correspondence with at least a partial region of a display included in or connected to the electronic device; and recognizing, by using an index of the virtual grid, a position selected by a user of the electronic device in the region of the display corresponding to the virtual grid.

7 Claims, 23 Drawing Sheets

Related U.S. Application Data continuation of application No. PCT/KR2017/001995, filed on Feb. 23, 2017.

(51) Int. Cl.
  *G06F 3/04883* (2022.01)
  *G06F 3/01* (2006.01)
  *G06F 21/36* (2013.01)
  *G06F 3/04886* (2022.01)

(52) U.S. Cl.
  CPC .......... *G06F 3/04886* (2013.01); *G06F 21/36* (2013.01); *G06F 21/45* (2013.01)

(56) References Cited

U.S. PATENT DOCUMENTS

| | | | | |
|---|---|---|---|---|
| 2010/0281526 | A1* | 11/2010 | Raghavan | H04L 63/083 726/7 |
| 2014/0267044 | A1* | 9/2014 | Andersen | G06F 3/04886 345/168 |
| 2015/0138101 | A1* | 5/2015 | Park | G06V 10/469 345/173 |
| 2017/0235484 | A1* | 8/2017 | Griffin | G06F 3/041 715/773 |

FOREIGN PATENT DOCUMENTS

| | | |
|---|---|---|
| KR | 1020120089452 A | 8/2012 |
| KR | 1020140055663 A | 5/2014 |
| KR | 101509495 B1 | 4/2015 |

\* cited by examiner

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

METHOD AND SYSTEM FOR RECOGNIZING INPUT USING INDEX OF VARIABLE GRID

CROSS-REFERENCE TO RELATED APPLICATIONS

This is a continuation U.S. patent application Ser. No. 16/124,929, filed Sep. 7, 2018, which is a continuation application of International Application No. PCT/KR2017/001995, filed Feb. 23, 2017, which claims benefit of Korean Patent Application No. 10-2016-0027629, filed Mar. 8, 2016.

BACKGROUND OF THE INVENTION

Field of Invention

Example embodiments of the present invention relate to a method and system for recognizing an input using an index of a variable grid.

Description of Related Art

There are attempts to leak personal information through hacking tools for intercepting signals input from users in electronic devices. To prevent such attempts, there is a related art of using a virtual keyboard in which keys are randomly rearranged. For example, Korean Patent Laid-Open Publication No. 10-2007-0010557 relates to a key input hacking prevention method and discloses a technique for receiving data, such as an identifier (ID) or a password, from a user through a virtual keyboard on which keys are randomly rearranged on a webpage requiring a security or an application program that provides a similar function thereto, and transmitting the received data to the webpage or the application program and thereby preventing leakage of personal information by a hacking program, such as a keylogger.

However, if it is possible to be aware of a layout of the virtual keyboard and a location selected by a user on a coordinate system of an electronic device, a key selected by the user on the virtual keyboard may be inferred.

BRIEF SUMMARY OF THE INVENTION

One or more example embodiments provide an input recognition method and system that may recognize a location selected by a user using an index of a virtual grid of which a distance between lines is variable as coordinates, instead of using coordinates of a coordinate system used on an electronic device and thereby prevent the location selected by the user from being inferred.

One or more example embodiments also provide an input recognition method and system that may generate a virtual grid by changing a distance between lines of the virtual grid per input session, and may recognize a different index of the virtual grid even with respect to the same location selected by a user.

One or more example embodiments also provide an input recognition method and system that may include a preset touch pattern in a portion of a password or a pattern input from a user and may authenticate the user in response to a touch pattern associated with a partial number or a partial pattern as well as a touch pattern associated with the password or the pattern of the user obtained based on a location selected by the user matching the preset touch pattern.

According to an aspect of at least one example embodiment, there is provided an input recognition method performed by an electronic device configured as a computer, the method including generating a virtual grid of which a distance between lines is variable based on at least a partial region of a display included in the electronic device or connected to the electronic device; and recognizing a location selected by a user of the electronic device on a region of the display corresponding to the virtual grid, using an index of the virtual grid.

According to an aspect of at least one example embodiment, there is provided an input recognition method performed by a server configured as a computer, the method including receiving an index of a virtual grid recognized on an electronic device over a network using the virtual grid of which a distance between lines is variable, the virtual grid corresponding to a region of a virtual keyboard displayed on a display of the electronic device; and determining a key of the virtual keyboard corresponding to the received index based on the received index, a layout of the virtual keyboard, and index information of the virtual grid. The index information of the virtual grid includes at least one of information about the distance between the lines of the virtual grid and information about locations of the lines of the virtual grid.

According to an aspect of at least one example embodiment, there is provided an input recognition system of an electronic device configured as a computer, the input recognition system including a memory configured to store computer-readable instructions; and at least one processor configured to execute the instructions. The at least one processor includes a virtual grid generator configured to generate a virtual grid of which a distance between lines is variable based on at least a partial region of a display included in the electronic device or connected to the electronic device; and a selected location recognizer configured to recognize a location selected by a user of the electronic device on a region of the display corresponding to the virtual grid, using an index of the virtual grid.

According to an aspect of at least one example embodiment, there is provided an input recognition system of a server configured as a computer, the input recognition system including a memory configured to store computer-readable instructions; and at least one processor configured to execute the instructions. The at least one processor includes a reception controller configured to receive an index of a virtual grid recognized on an electronic device over a network using the virtual grid of which a distance between lines is variable, the virtual grid corresponding to a region of a virtual keyboard displayed on a display of the electronic device; and a key determiner configured to determine a key of the virtual keyboard corresponding to the received index based on the received index, a layout of the virtual keyboard, and index information of the virtual grid. The index information of the virtual grid includes at least one of information about the distance between the lines of the virtual grid and information about locations of the lines of the virtual grid.

According to example embodiments, it is possible to recognize a location selected by a user using an index of a virtual grid of which a distance between lines is variable as coordinates, instead of using coordinates of a coordinate system used on an electronic device and thereby prevent the location selected by the user from being inferred.

Also, according to example embodiments, it is possible to generate a virtual grid by changing a distance between lines of the virtual grid per input session, and to recognize a different index of the virtual grid even with respect to the same location selected by a user.

Also, according to example embodiments, it is possible to include a preset touch pattern in a portion of a password or a pattern input from a user and to authenticate the user in response to a touch pattern associated with a partial number or a partial pattern as well as a touch pattern associated with the password or the pattern of the user obtained based on a location selected by the user matching the preset touch pattern.

BRIEF DESCRIPTION OF THE DRAWINGS

FIG. 6 illustrates an example of an index of a virtual grid according to one embodiment.

FIG. 7 illustrates an example of a virtual grid of which a distance between lines is changed according to one embodiment.

DETAILED DESCRIPTION OF THE INVENTION

Hereinafter, example embodiments are described with reference to the accompanying drawings.

Figure 1:
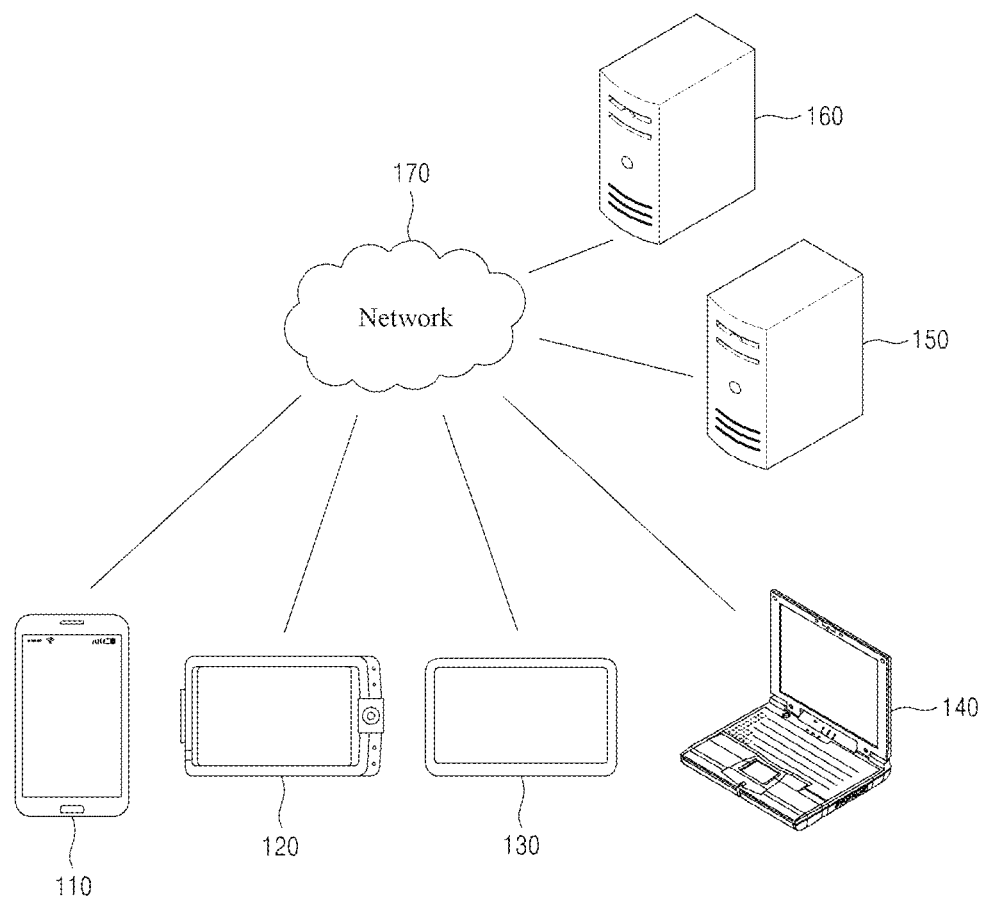
FIG. 1 is a diagram illustrating an example of a network environment according to one embodiment.

FIG. 1 is a diagram illustrating an example of a network environment according to one embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile device that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and 140 over the network 170. For example, the electronic device 110 may access the server 150 through an application installed on the electronic device 110 and may be provided with a preset service, for example, a game service, a chat service, a social network service (SNS), and a financial service.

Here, a user of the electronic device 110 may receive personal information, such as an identifier (ID) or a password, an account number or a credit card number, a pattern, and the like, through the electronic device 110. In this case, the electronic device 110 may recognize information input from the user using an input recognition method according to example embodiments. According to other example embodiments, the electronic device 110 may transfer the recognized information to the server 150 over the network 170. In this case, the electronic device 110 may transfer, to the server 150, information based on an index of a virtual grid that is recognized through an input recognition method according to example embodiments. The server 150 may recognize the information input from the user based on the index of the virtual grid.

Figure 2:
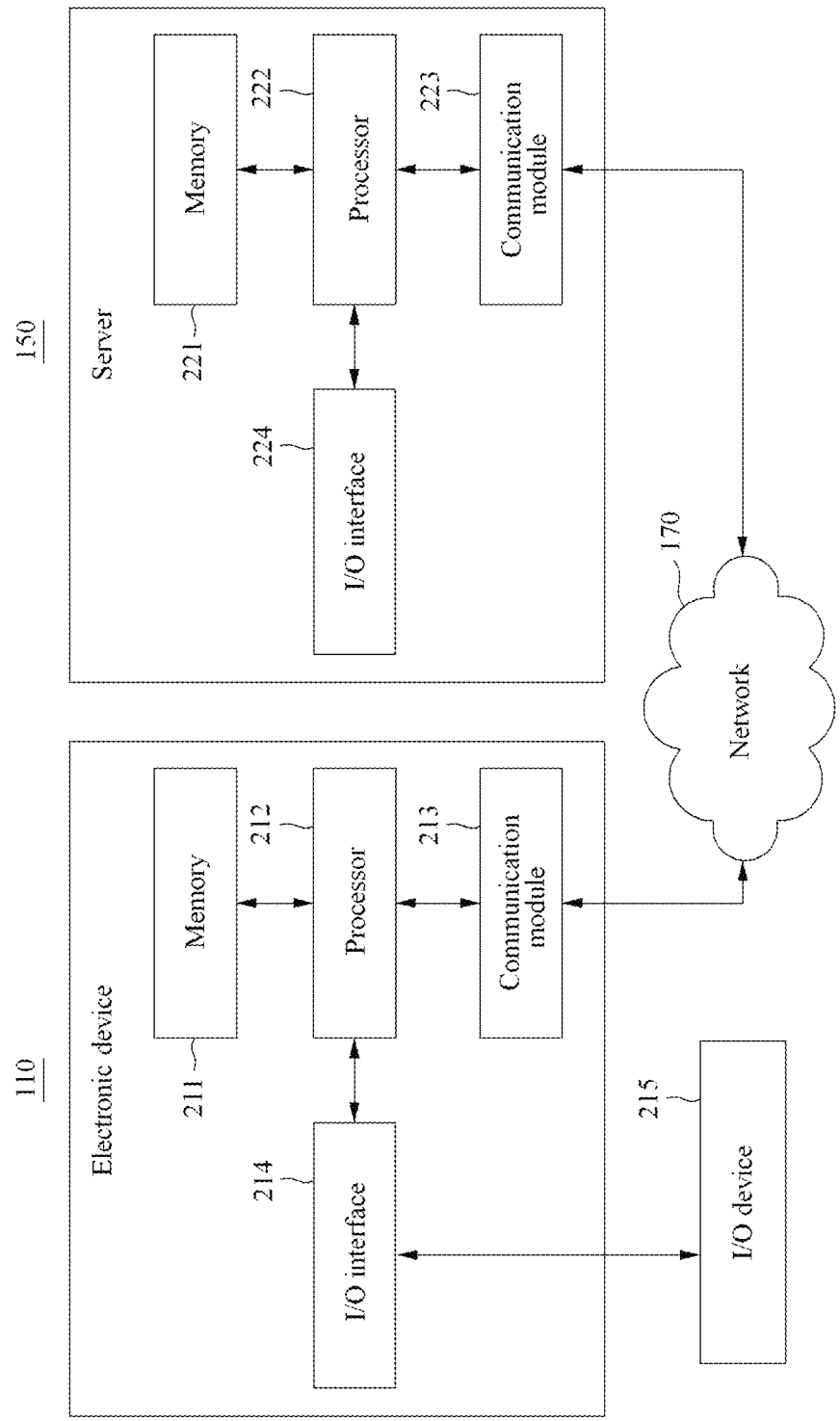
FIG. 2 is a block diagram illustrating an example of a configuration of an electronic device and a server according to one embodiment.

FIG. 2 is a block diagram illustrating an example of a configuration of an electronic device and a server according to one embodiment. FIG. 2 illustrates a configuration of the electronic device 110 as an example for a single electronic device and illustrates a configuration of the server 150 as an example for a single server. The same or similar components may be applicable to other electronic devices 120, 130, 140, or the server 160, and also to still other electronic devices or still other servers.

Referring to FIG. 2, the electronic device 110 includes a memory 211, a processor 212, a communication module 213, and an input/output (I/O) interface 214, and the server 150 includes a memory 221, a processor 222, a communication module 223, and an I/O interface 224. The memories 211, 221 may include a permanent mass storage device, such as random access memory (RAM), read only memory (ROM), and a disk drive, as a non-transitory computer-readable storage medium. Here, a ROM and a permanent massage storage device may also be included as a permanent storage device separate from the memories 211 and 221. Also, an operating system (OS) or at least one program code, for example, a code for an application for providing a specific service or a browser installed and executed on the electronic device 110, etc., may be stored in the memory 211, 221. Such software components may be loaded from another non-transitory computer-readable storage medium separate from the memory 211, 221. Other non-transitory computer-readable storage medium may include, for example, a floppy drive, a disk, a tape, a DVD/CD-ROM drive, a memory card, etc. According to other embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for a video call service, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 is used for interfacing with an I/O device 215. For example, the I/O device 215 may include an input device such as a keyboard and a mouse, and an output device such as a display for displaying a communication session of the application. As another example, the I/O interface 214 may be a device for interfacing with an apparatus in which an input function and an output function are integrated into a single function, such as a touchscreen. In detail, when processing instructions of the computer program loaded to the memory 211, the processor 212 of the electronic device 110 may display a service screen configured using data provided from the server 150 or the electronic device 120, or may display content on a display through the I/O interface 214.

Also, according to other embodiments, the electronic device 110 and the server 150 may include a greater or lesser number of components than the number of components shown in FIG. 2. For example, the electronic device 110 may include at least a portion of the I/O device 215, or may further include components, for example, a transceiver, a global positioning system (GPS) module, a camera, a variety of sensors, and a database. In detail, if the electronic device 110 is a smartphone, the electronic device 110 may be configured to further include various components, for example, an acceleration sensor, a gyro sensor, a camera, various types of physical buttons, a button using a touch panel, an I/O port, and a vibrator for vibration.

Figure 3:
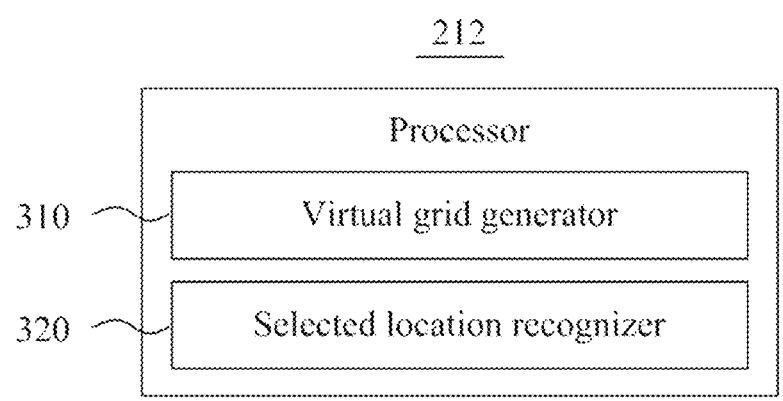
FIG. 3 is a block diagram illustrating components includable in a processor of an electronic device according to one embodiment.
Figure 4:
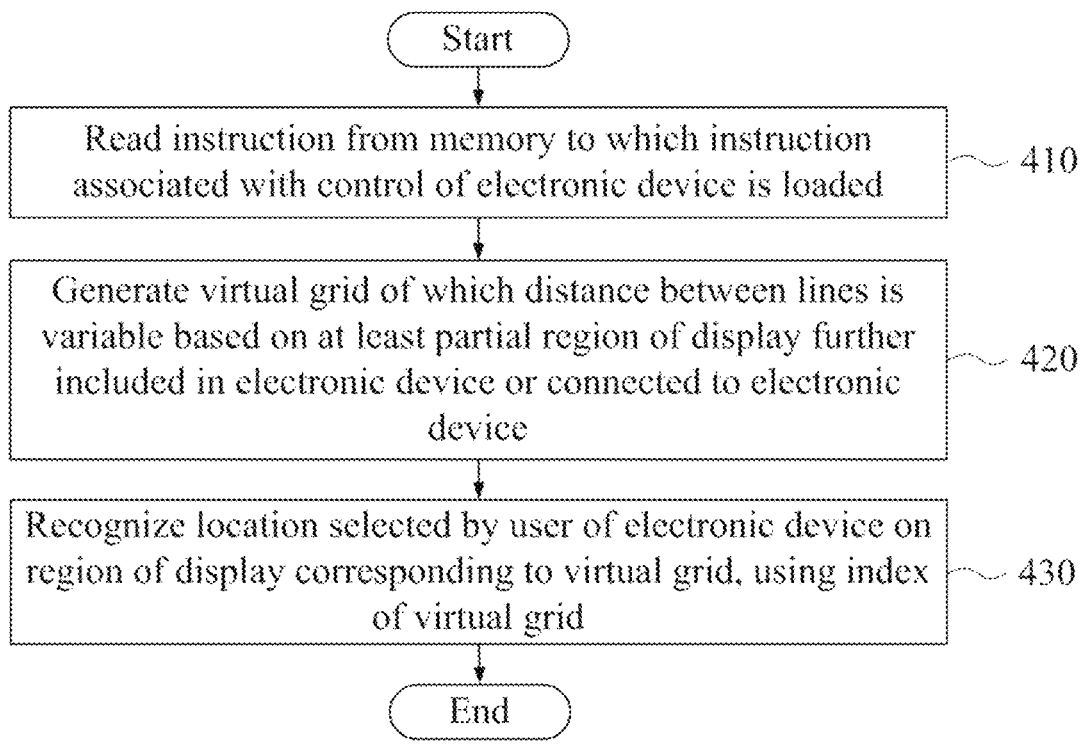
FIG. 4 is a flowchart illustrating a method performed by an electronic device according to one embodiment.

FIG. 3 is a block diagram illustrating components includable in the processor 212 of the electronic device 110 according to one embodiment, and FIG. 4 is a flowchart illustrating a method performed by the electronic device 110 according to one embodiment.

The electronic device 110 may implement an input recognition system according to an example embodiment. Referring to FIG. 3, the processor 212 included in the electronic device 110 may include a virtual grid generator 310 and a selected location recognizer 320 as components. The processor 212 and the components of the processor 212 may control the electronic device 110 to perform operations 410 through 430 included in the input recognition method of FIG. 4. Here, the processor 212 and the components of the processor 212 may be configured to execute an instruction according to a code of at least one program and a code of an OS included in the memory 211. Here, the components of the processor 212 may be representations of different functions performed by the processor 212 in response to a control instruction provided from a program code stored in the electronic device 110. For example, the virtual grid generator 310 may be used as a functional representation of the processor 212 that controls the electronic device 110 to generate a virtual grid in response to the control instruction.

Referring to FIG. 4, in operation 410, the processor 212 may read, from the memory 211 to which an instruction associated with control of the electronic device 110 is loaded, the instruction. Here, the instruction may include at least a portion of an instruction for controlling the processor 212 to perform the following operations 420 and 430.

In operation 420, the virtual grid generator 310 may generate a virtual grid of which a distance between lines is variable based on at least a partial region of a display included in the electronic device 110 or connected to the electronic device 110. For example, the virtual grid may be generated so that a portion of regions of the display encompassed by the lines of the virtual grid may have different widths and a distance between the lines may be variable every time the virtual grid is generated. The virtual grid may be generated based on an entire region or a partial region of the display instead of being visually displayed on the display. The number of lines for the virtual grid may be desired. The distance between the lines for the virtual grid may be set based on the height and the width of the virtual keyboard displayed on the display and the desired number of lines. For example, assuming that the width of the virtual keyboard is a relative value of 10000 and the number of horizontal lines is 100, an average distance between the horizontal lines may be a relative value of 100. Also, assuming that the height of the virtual keyboard is a relative value of 8000 and the number of vertical lines is 100, an average distance between the vertical lines may be a relative value of 80. In this case, a base virtual grid in which the number of horizontal lines is 100, the number of vertical lines is 100, the average distance between the horizontal lines is a relative value of 100, and the average distance between the vertical lines is a relative value of 100, may be generated virtually. The virtual grid generator 310 may generate a new virtual grid by changing the position of at least one line randomly selected in the base virtual grid, within the base virtual grid. The virtual grid generator 310 may repeatedly generate virtual grids in the same manner for each session for generating the virtual grid. It is possible that the same virtual grid may be generated in different sessions, but in most cases virtual grids generated will be different from each other.

In operation 430, the selected location recognizer 320 may recognize a location selected by a user of the electronic device 110 on a region of the display corresponding to the virtual grid, using an index of the virtual grid. For example, the index of the virtual grid may be recognized using a matrix corresponding to the virtual grid. That is, if the location selected by the user is included in a region of a first column of a first line of the virtual grid, an index of (1, 1) may be recognized. Alternatively, indices that sequentially increase in order from left to right and from top to bottom may be used. In this case, the region of the first line of the virtual grid may have an index of '1' and a region of a first column of a second line of the virtual grid may have an index of '2'. As described above, a structure selected from among various structures may be used for the index of the virtual grid. Hereinafter, for clarity of description, example embodiments are described based on a structure of indices that sequentially increase in order from left to right and from top to bottom.

The example embodiments instruct the location selected by the user using the index of the virtual grid of which a distance between lines is variable, instead of using a coordinate system of the electronic device 110. Thus, although an attacker may acquire the index of the virtual grid, the attacker may not easily infer the location selected by the user using the index only.

Figure 5:
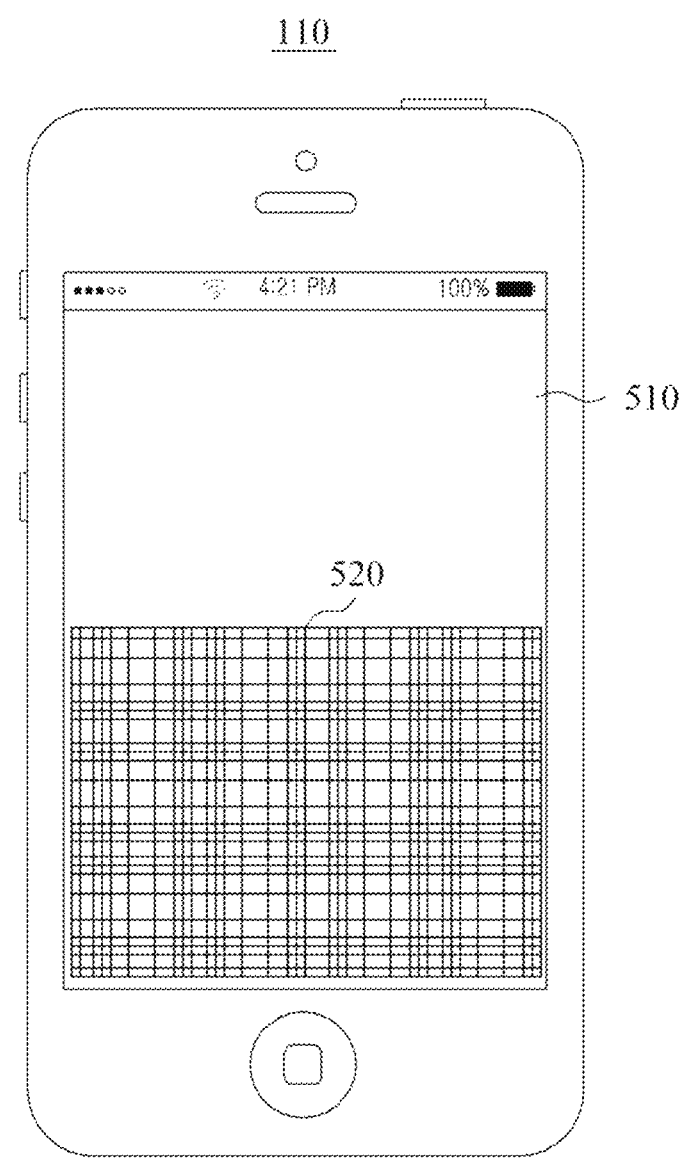
FIG. 5 illustrates an example of a virtual grid corresponding to a partial region of a display according to one embodiment.

FIG. 5 illustrates an example of a virtual grid corresponding to a partial region of a display according to at least one example embodiment. FIG. 5 illustrates an example of the electronic device 110 and also illustrates an example in which a virtual grid 520 corresponds to a portion of a display 510 of the electronic device 110. As described above, the virtual grid 520 is not visually displayed on the display 510 and is illustrated for understanding. For example, the portion of the display 510 may be an area of the virtual keyboard displayed on the display 510. The electronic device 110 may identify the area of the virtual keyboard, and may map an area of the virtual grid 520 to the area of the virtual keyboard.

FIG. 5 illustrates an embodiment in which the electronic device 110 includes a touchscreen, such as a smartphone. In this case, a location selected by a user may include a location at which a touch is recognized on the touchscreen. According to other embodiments, the electronic device 110 may include a PC environment. In this case, the location selected by the user may include a location at which a mouse is clicked. A type of the electronic device 110 or a scheme used for the user to select the location is not limited to the touchscreen. A user interface, such as a virtual keyboard, may be displayed. The example embodiments may be applied to any type of devices that enable the user to select a specific display location.

FIG. 6 illustrates an example of an index of a virtual grid according to at least one embodiment. FIG. 6 illustrates a virtual grid 610 on which 100 regions are divided using indices from 1 to 100. For example, if a location selected by a user on a display corresponding to the virtual grid 610 corresponds to an index '47' of the virtual grid 610, the selected location recognizer 320 would recognize the location selected by the user based on the index '47' in operation 430 of FIG. 4.

A virtual grid according to example embodiments may be maintained for a single input session. In operation 420, the virtual grid generator 310 may generate a virtual grid of which a distance between lines is changed per different input session.

FIG. 7 illustrates an example of a virtual grid of which a distance between lines is changed according to one embodiment. Comparing a virtual grid 710 of FIG. 7 to the virtual grid 610 of FIG. 6, the sizes of the grids are identical, however, distances between lines are different. In this case, indices of the virtual grids 610 and 710 corresponding to the same location selected by the user may vary. For example, the width of a region corresponding to the index '47' of the virtual grid 610 is reduced in the virtual grid 710.

A single input session may be maintained while the user selects a specific location on a single virtual screen, for example, a virtual keyboard, and the location selected by the user is being recognized. In response to terminating the virtual screen, the single input session may be terminated. Also, in response to changing the virtual screen, the single input session may be terminated. For example, if a virtual keyboard for inputting an uppercase letter is replaced with a virtual keyboard for inputting a lowercase letter on a mobile virtual screen, the single input session may be terminated and a new input session may be initiated by the processor 212 of the electronic device 110. In this case, a distance between lines of a virtual grid may vary and the virtual grid may be regenerated accordingly. That is, layouts of various virtual keyboards, for example, uppercase letters and lowercase letters of English alphabets, Korean alphabets, and special characters, are present and if a layout changes, it may indicate that the virtual screen is changed. The new input session may be initiated and the virtual grid may be regenerated. Accordingly, an index of a virtual grid generated in a first input session and an index of a virtual grid generated in a second input session may differ from each other with respect to at least one same location on a display.

A virtual grid according to one embodiment may correspond to a region on which a virtual keyboard is displayed on a display. In operation 430 of FIG. 4, the selected location recognizer 320 may recognize, as the location selected by the user, an index of the virtual grid corresponding to the location selected by the user on the region on which the virtual keyboard is displayed. In this case, the processor 212 of the electronic device 110 may recognize a key of the virtual keyboard selected by the user based on the layout of the virtual keyboard and the recognized index.

Figure 8:
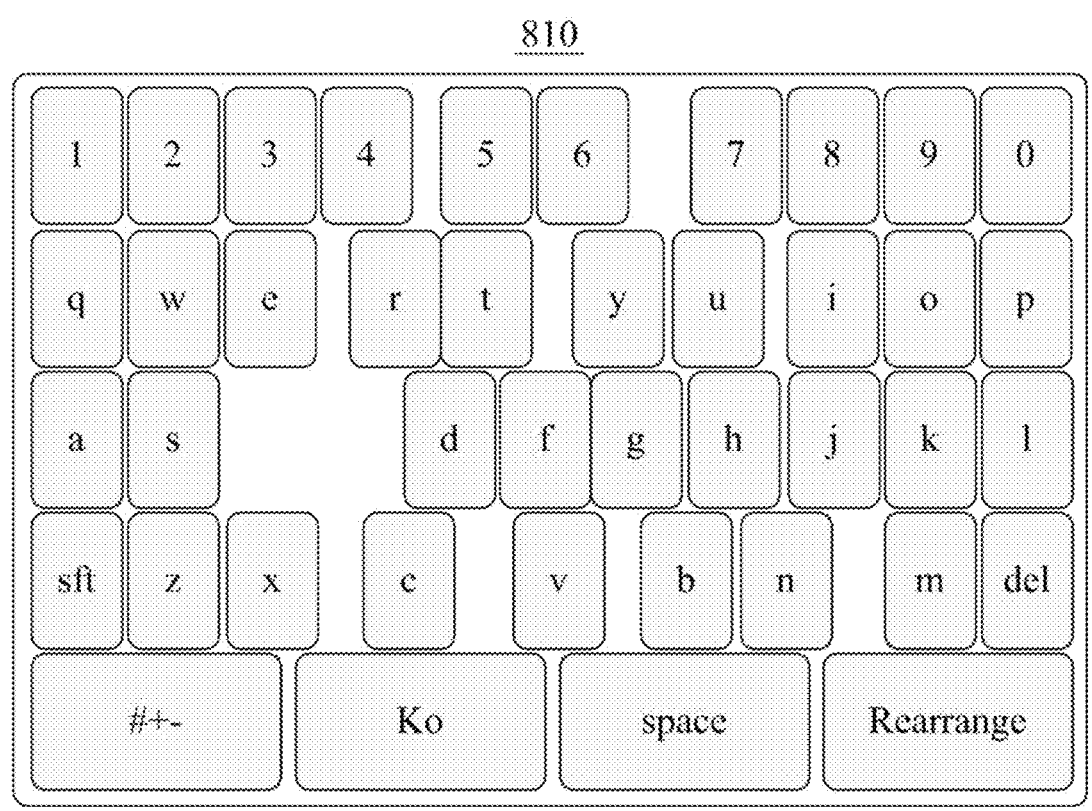
FIG. 8 illustrates an example of a virtual keyboard according to one embodiment.
Figure 9:
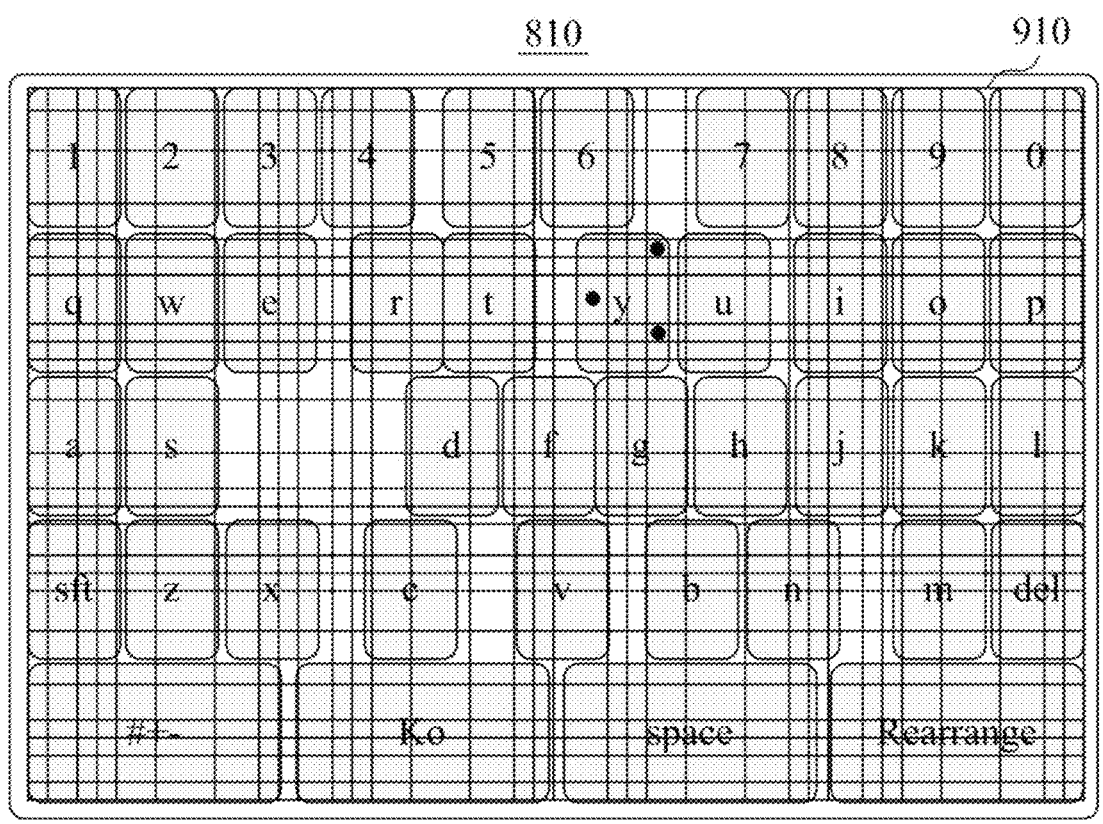
FIG. 9 illustrates an example of a virtual grid corresponding to a virtual keyboard according to one embodiment.

FIG. 8 illustrates an example of a virtual keyboard according to one embodiment, and FIG. 9 illustrates an example of a virtual grid corresponding to a virtual keyboard according to one embodiment. Referring to a virtual grid 910 corresponding to a virtual keyboard 810, although a user presses the same key 'y' of the virtual keyboard 810, a different index of the virtual grid 910 may be recognized based on a location at which the key is pressed.

The processor 212 of the electronic device 110 may recognize a key per location based on a layout of the virtual keyboard 810 and may determine a key corresponding to an index of the virtual grid 910 recognized with respect to the location selected by the user. Here, regions included in the virtual grid 910 may be configured so that a single region or index in the virtual grid 910 may not correspond to a plurality of keys.

Figure 10:
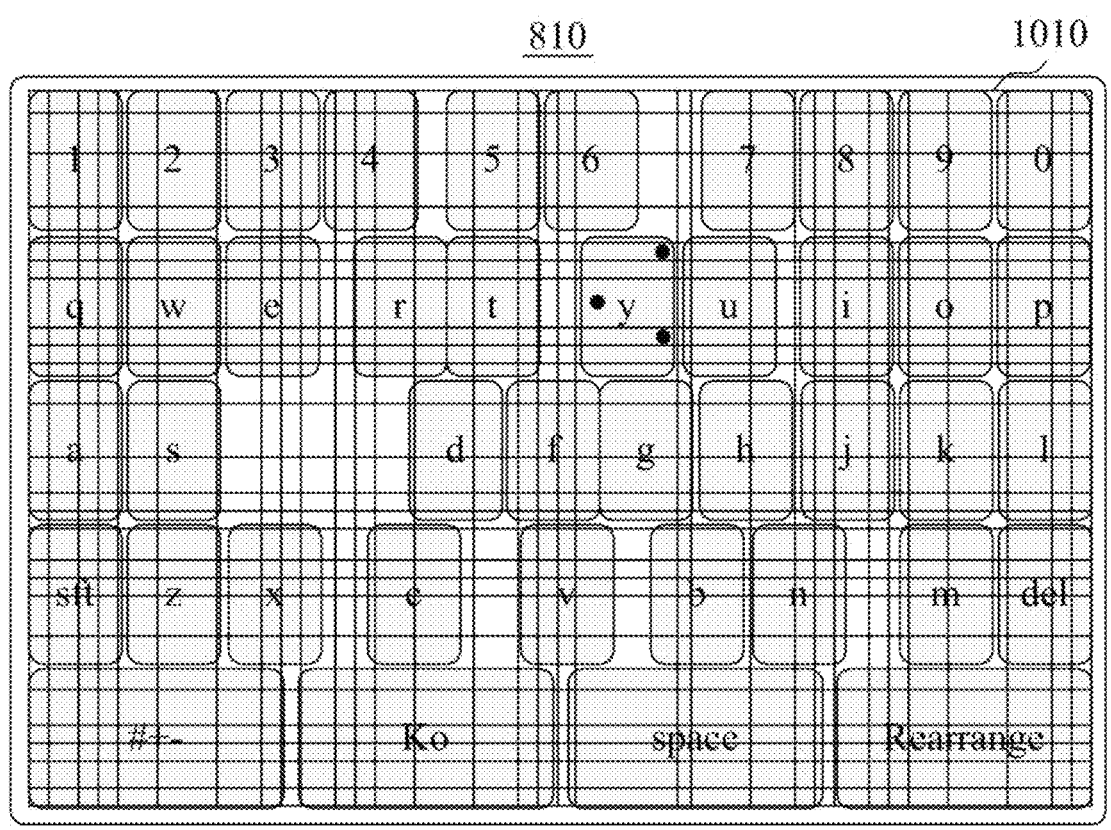
FIG. 10 illustrates another example of a virtual grid corresponding to a virtual keyboard according to one embodiment.

FIG. 10 illustrates another example of a virtual grid corresponding to a virtual keyboard according to at least one example embodiment. Referring to FIG. 10, a distance between the lines of a virtual grid 1010 of FIG. 10 is changed compared to that of the virtual grid 910 of FIG. 9. In particular, referring to the key 'y', an index of the virtual grid 1010 differs from an index of the virtual grid 910 with respect to the same location.

According to example embodiments, keys of a virtual keyboard may be recognized at the electronic device 110 and may also be recognized at the server 150 for further securing protection of personal information.

Figure 11:
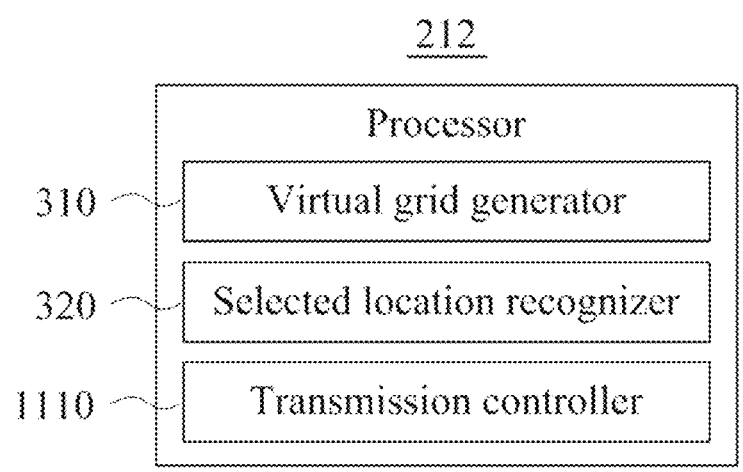
FIG. 11 is a block diagram illustrating components further includable in a processor of an electronic device according to one embodiment.
Figure 12:
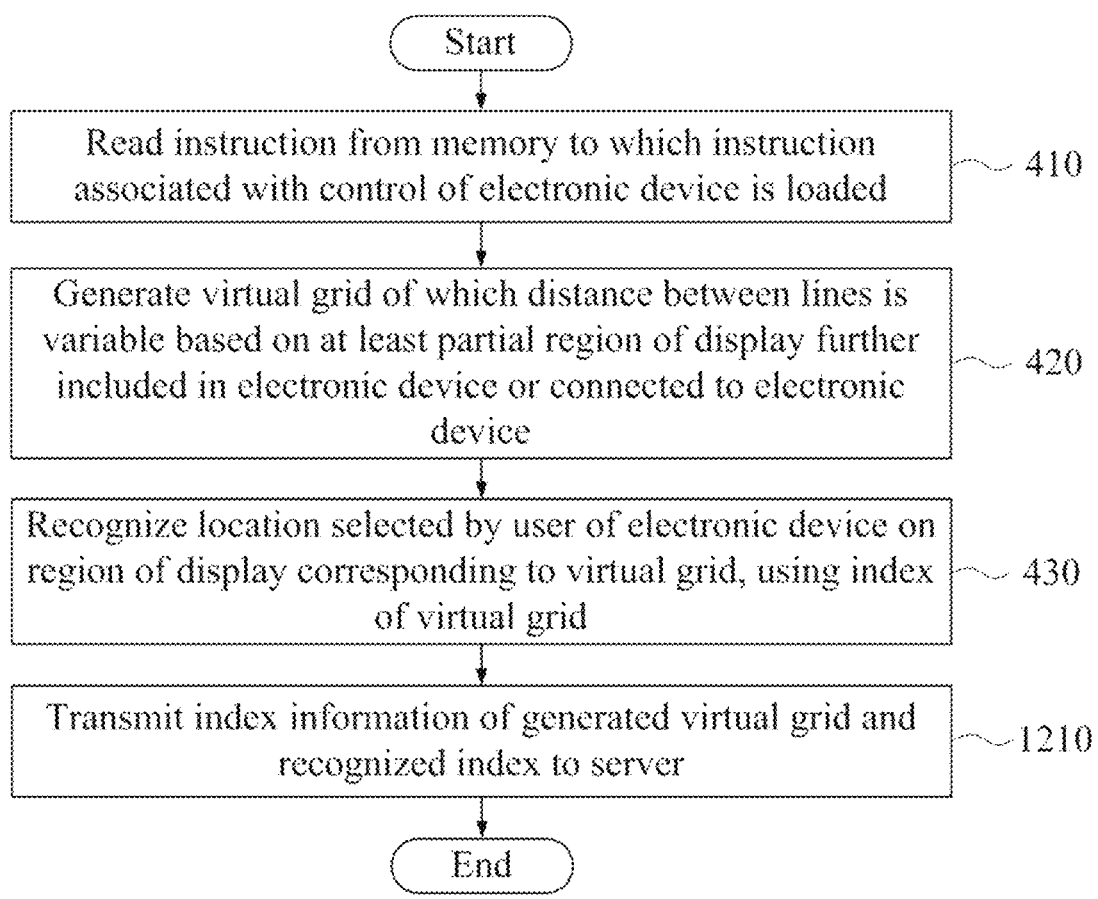
FIG. 12 is a flowchart illustrating a method performed by an electronic device according to one embodiment.

FIG. 11 is a block diagram illustrating an example of a component further includable in the processor 212 of the electronic device 110 according to one embodiment, and FIG. 12 is a flowchart illustrating a method performed by the electronic device 110 according to one embodiment.

Referring to FIG. 11, the processor 212 may further include a transmission controller 1110 in addition to the virtual grid generator 310 and the selected location recognizer 320 of FIG. 3. The transmission controller 1110 may perform operation 1210 of FIG. 12. The transmission controller 1110 may also be a functional representation of the processor 212.

Referring to FIG. 12, in operation 1210, the transmission controller 1110 may transmit the index information of the generated virtual grid and the recognized index selected by the user to the server 150. Here, the index information of the virtual grid may include at least one of information about the distance between the lines of the virtual grid and information about locations of the lines of the virtual grid. In this case, the server 150 may generate the virtual grid based on the index information of the virtual grid. Accordingly, the server 150 may recognize a key of the virtual keyboard selected by the user on the electronic device 110 based on the index information of the virtual grid, the layout of the virtual keyboard, and the recognized index.

Figure 13:
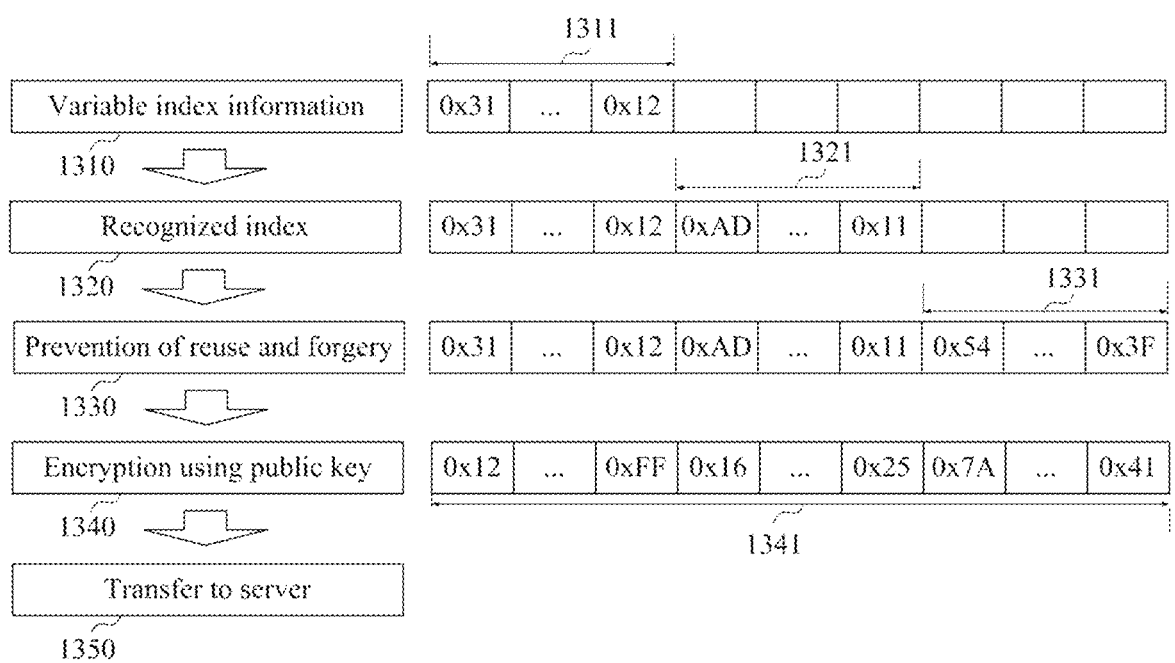
FIG. 13 illustrates a process of transmitting index information and a recognized index to a server according to one embodiment.

FIG. 13 illustrates an example of a process of transmitting index information and a recognized index to the server 150 according to one example embodiment.

Referring to FIG. 13, process 1310 illustrates an example of hexadecimal data 1311 for variable index information as an example of a process of setting the variable index information. As described above, index information about a virtual grid may include at least one of information about a distance between lines of the virtual grid and information about locations of the lines of the virtual grid.

Process 1320 illustrates an example of hexadecimal data 1321 for a recognized index as an example of a process of setting the recognized index. Four indices may be recognized for a 4-digit password of a user. Here, although the user selects the same key and the same location on a virtual keyboard, a different index may be recognized. Selectively, a virtual grid may be generated so that a different index may be recognized at all times for the same key and/or the same location.

Process 1330 illustrates an example of hexadecimal data 1331 for information for preventing reuse and forgery as an example of a process of setting prevention information for preventing reuse and forgery of the index information and the recognized index. Here, reuse prevention information may be generated based on a time. For example, the reuse prevention information may be generated to limit the use of the recognized index after a predetermined (or, alternatively, desired) period of time is elapsed based on a time at which the virtual grid is generated and/or a time at which the index is recognized. Forgery prevention information may include a signature and a hash value for the recognized index and the variable index information. For example, the reuse prevention information and/or the forgery prevention information may be generated by the processor 212 of the electronic device 110.

Process 1340 illustrates an example in which a value of encrypted hexadecimal data 1341 is modulated, as an example of a process of encrypting the variable index information, the recognized index, and the reuse and forgery prevention information with a public key of the server 150. For example, the electronic device 110 may generate input information that includes the index information, the recognized index, and the prevention information, and may encrypt the generated input information with the public key of the server 150 by the processor 212 of the electronic device 110.

Process 1350 illustrates an example of a process of transferring the encrypted hexadecimal data 1341 to the server 150. The server 150 may receive and decrypt the encrypted hexadecimal data 1341 and may prevent the reuse or the forgery of the variable index information and the recognized index based on the reuse and forgery prevention information. Also, as described above, the server 150 may recognize a key of the virtual keyboard selected by the user on the electronic device 110 based on the index information of the virtual grid, a layout of the virtual keyboard, and the recognized index.

According to other example embodiments, the selected location recognizer 320 may receive at least one of information about the distance between the lines of the virtual grid and information about locations of the lines of the virtual grid from the server 150 and may generate the virtual grid based on the received at least one piece of information.

In this case, the server 150 may be aware of the index information of the generated virtual grid. Thus, the server 150 may receive only the recognized index from the electronic device 110 and may recognize the key of the virtual keyboard selected by the user based on the known index information, the recognized index received from the electronic device 110, and the layout of the virtual keyboard.

Figure 14:
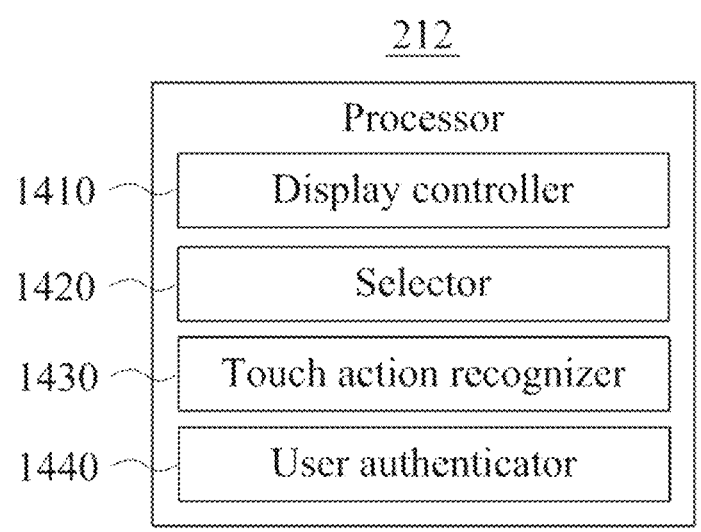
FIG. 14 is a block diagram illustrating additional components includable in a processor of an electronic device according to one embodiment.
Figure 15:
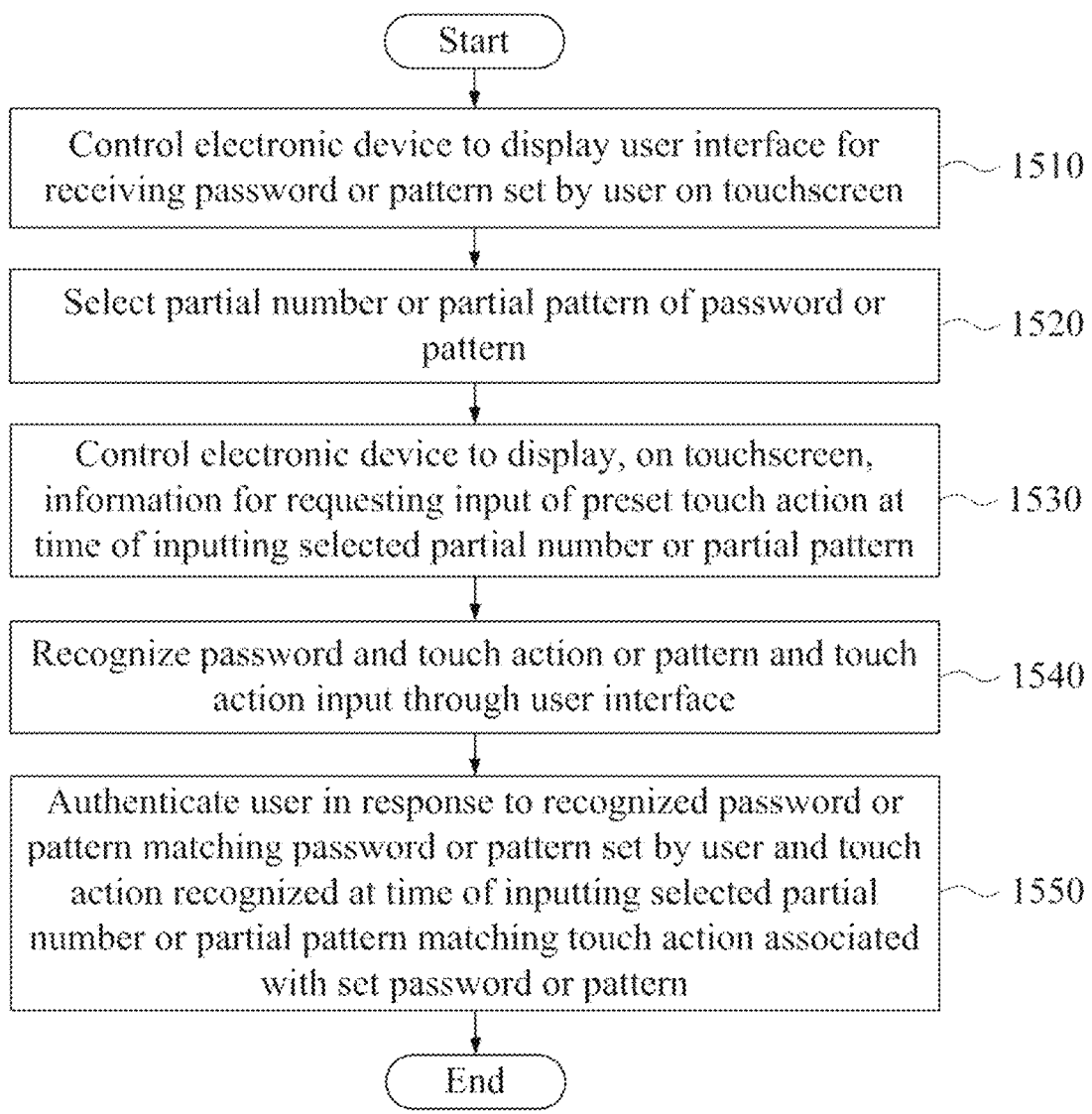
FIG. 15 is a flowchart illustrating another method performed by an electronic device according to one embodiment.

FIG. 14 is a block diagram illustrating another example of components includable in the processor 212 of the electronic device 110 according to one embodiment, and FIG. 15 is a flowchart illustrating another method performed by the electronic device 110 according to at least one example embodiment. The following example embodiments may be implemented in combination with the aforementioned example embodiments or may be implemented in a separate independent form.

Referring to FIG. 14, the processor 212 of the electronic device 110 may include a display controller 1410, a selector 1420, a touch action recognizer 1430, and a user authenticator 1440 as components. According to an exemplary embodiment, the processor 212 may include the virtual grid generator 310 and the selected location recognizer 320 of FIG. 3, and may further include the display controller 1410, the selector 1420, the touch action recognizer 1430, and the user authenticator 1440. According to other embodiments, the processor 212 may include only the display controller 1410, the selector 1420, the touch action recognizer 1430, and the user authenticator 1440 of FIG. 14.

The display controller 1410, the selector 1420, the touch action recognizer 1430, and the user authenticator 1440 may be configured to perform operations 1510 through 1550 included in the input recognition method of FIG. 15. Also, the display controller 1410, the selector 1420, the touch action recognizer 1430 and the user authenticator 1440 may be functional representations of the processor 212.

Referring to FIG. 15, in operation 1510, the display controller 1410 may control the I/O interface 214 to display a user interface for receiving a password or a pattern set by a user on a touchscreen.

In operation 1520, the selector 1420 may select a partial number or a partial pattern of the password or the pattern. For example, if the password includes '1, 2, 3, 4', the selector 1420 may select a partial number '2' or '2, 3'. As an example of the pattern, a partial pattern may be selected in association with at least one of instructors for assisting an input of the pattern.

In operation 1530, the display controller 1410 may control the electronic device 110 to display, on the touchscreen, information for requesting an input of a preset touch action at a time of inputting the selected partial number or partial pattern. For example, in response to an input of the selected partial number '2', information for requesting an input of the preset touch action may be displayed on the touchscreen. Also, in response to an input of the partial pattern associated with the selected specific instructor, information for requesting an input of the preset touch action may be displayed on the touchscreen.

In operation 1540, the touch action recognizer 1430 may recognize the password and the touch action or the pattern and the touch action that are input through the user interface. Recognition of the touch action will be further described.

In operation 1550, the user authenticator 1440 may authenticate the user in response to the recognized password or pattern matching the password or the pattern set by the user and the touch action recognized at a time of inputting the selected partial number or partial pattern matching a touch action associated with the set password or pattern.

According to other example embodiments, the processor 212 may control the electronic device 110 to transmit the recognized password and touch action or the recognized pattern and touch action to the server 150 over a network. In this case, the server 150 may authenticate the user, in response to the recognized password or pattern matching the password or the pattern set by the user and the touch action recognized at a time of inputting the selected partial number or partial pattern matching the preset touch action.

According to other example embodiments, the password and the touch action or the pattern and the touch action may be input together and may be preset as the password or the pattern of the user. In this case, without a need to separately display information for requesting the input of the preset touch action, the user may input the password and the touch action or the pattern and the touch action. For example, the processor 212 may recognize a touch action preset for a partial number or a partial pattern of a password or a pattern while receiving the password or the pattern from the user. Also, the processor 212 may mutually associate and set, as the password of the user, the input password and the touch action recognized for the partial number or may mutually associate and set, as the pattern of the user, the input pattern and the touch action recognized for the partial pattern. Depending on example embodiments, the password and the pattern may be set in the server 150. Here, the processor 212 may control the electronic device 110 to display a user interface for receiving the password or the pattern set by the user on the touchscreen and may recognize the password and the touch action or the pattern and the touch action that are input through the user interface. Even in this case, authentication of the user may be performed using all of matching or mismatching of the password or the pattern and matching or mismatching of the touch action.

The preset touch action may include a 3D touch action of applying a pressure on a region corresponding to the user interface displayed on the touchscreen in response to an input of the selected partial number or partial pattern.

Figure 16:
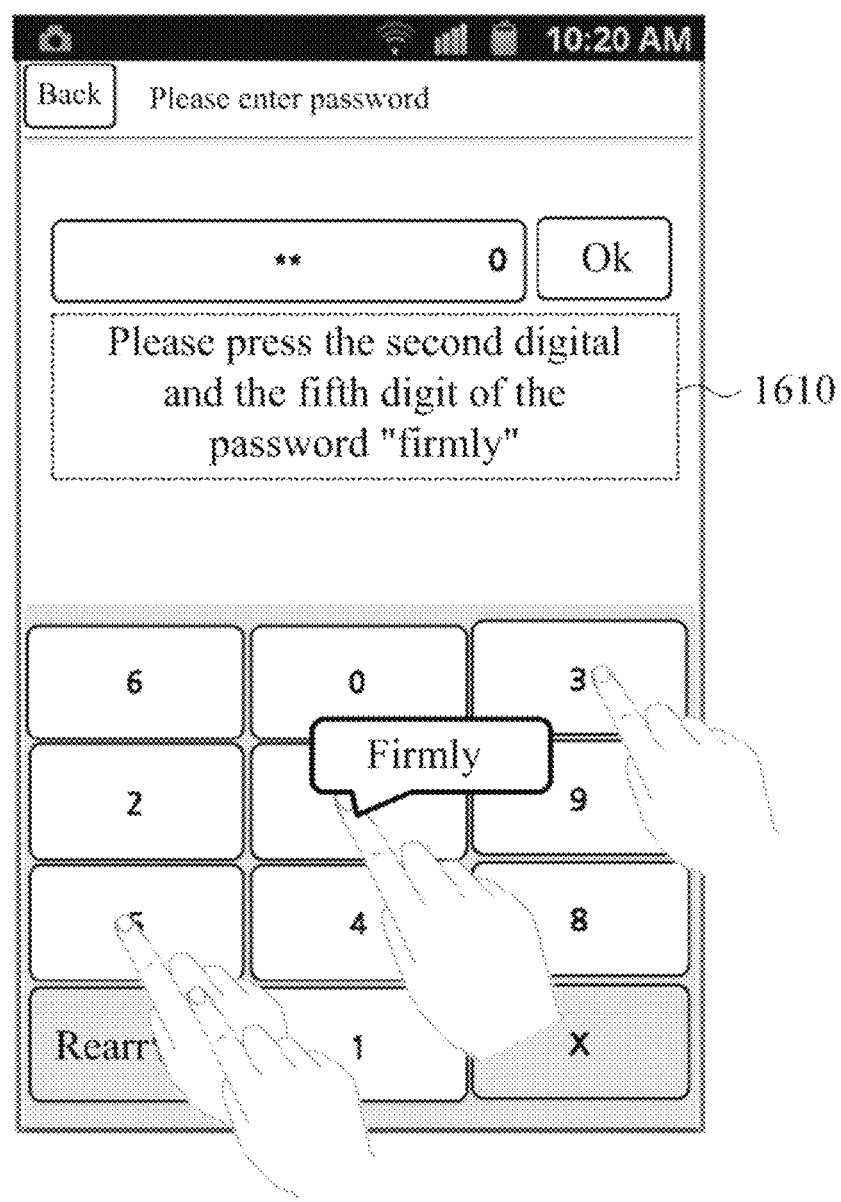
FIG. 16 illustrates an example of a process of authenticating a user using a three-dimensional (3D) touch according to one embodiment.

FIG. 16 illustrates an example of a process of authenticating a user using a 3D touch according to one embodiment. A first screen 1600 illustrates an example of a touchscreen on which a user interface, i.e., the I/O device 215 for inputting a password is displayed while requesting a user to input the password. Here, an example of information for requesting the user to input a 3D touch action for a partial number as a preset touch action with the password is displayed in a first box 1610 indicated with dotted lines. The user may input the password and the touch action together by inputting only the second digit and the fifth digit of the password through a 3D touch action on a keypad shown on the first screen 1600. If the touch action is preset as the password of the user with the password, separate request information may not be displayed.

Figure 17:
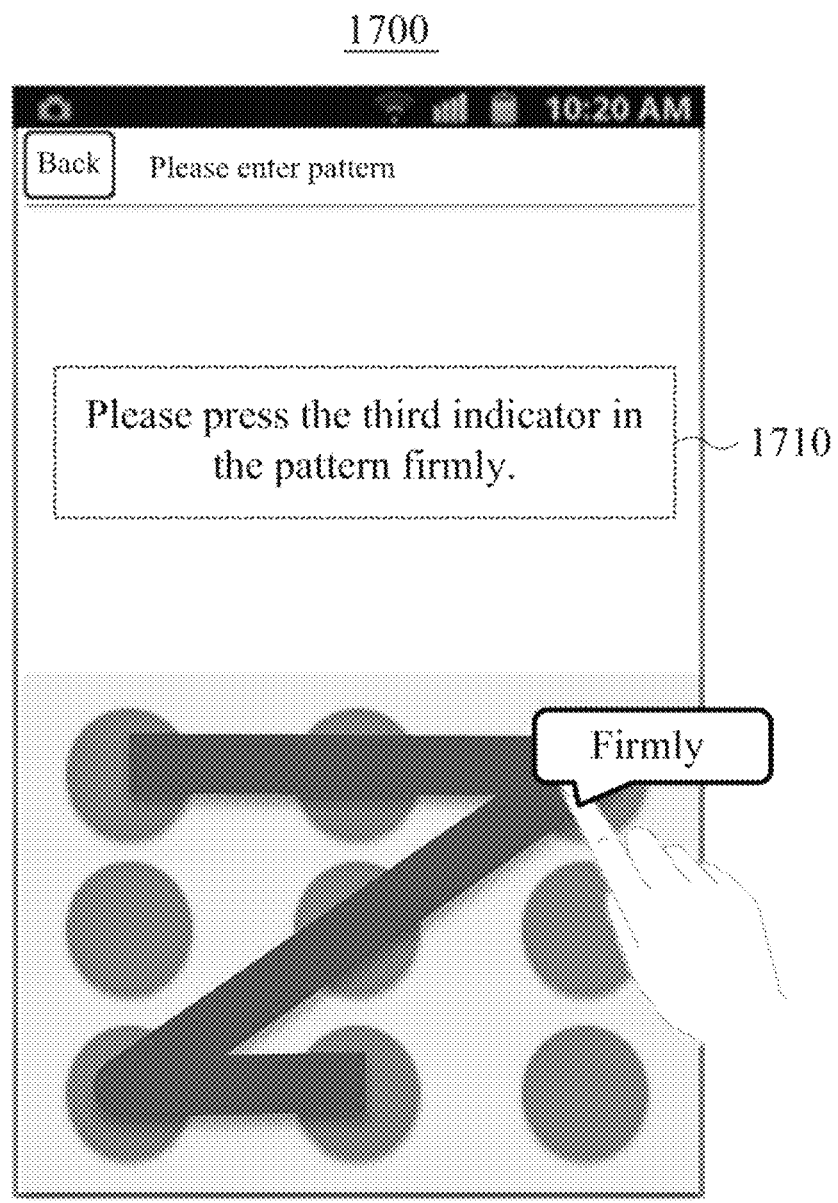
FIG. 17 illustrates another example of a process of authenticating a user using a 3D touch according to one embodiment.

FIG. 17 illustrates another example of a process of authenticating a user using a 3D touch according to one embodiment. A second screen 1700 illustrates an example of a touchscreen on which nine indicators are displayed as a user interface for inputting a pattern while requesting a user to input the pattern. Here, an example of information for requesting the user to input a 3D touch action for a partial pattern as a preset touch action with the pattern is displayed on a second box 1710 indicated with dotted lines. Even in this case, if the touch action is preset as the password of the user with the pattern, separate request information may not be displayed.

Also, the preset touch action may include an action of generating a touch for a preset period of time or more on a corresponding region of the user interface displayed on the touchscreen in response to an input of the selected partial number or partial pattern.

Figure 18:
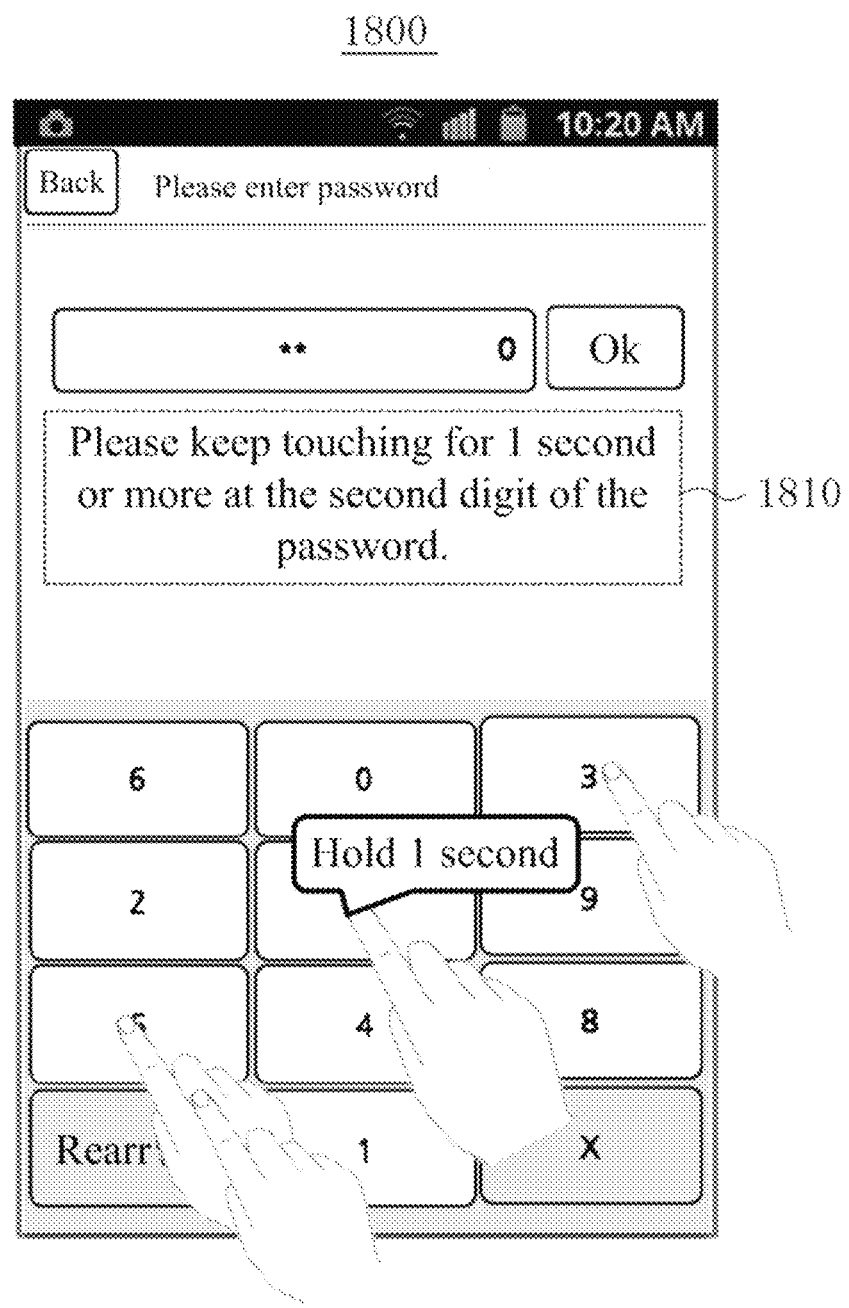
FIG. 18 illustrates an example of a process of authenticating a user using a touch time delay according to one embodiment.

FIG. 18 illustrates an example of a process of authenticating a user using a touch time delay according to one embodiment. A third screen 1800 illustrates an example of a touchscreen on which a user interface for inputting a password is displayed while requesting a user to input the password. Here, an example of information for requesting the user to maintain a touch on a partial number for a preset period of time or more with the password is displayed on a third box 1810 indicated with dotted lines. The user may input the password and the touch action together by maintaining a touch on a corresponding key for 1 second or more at a time of inputting a second digit of the password. The remainder of the digits of the password is entered after the second digit has been touched for 1 second or more. If the touch action is preset as the password of the user with the password, separate request information may not be displayed.

Figure 19:
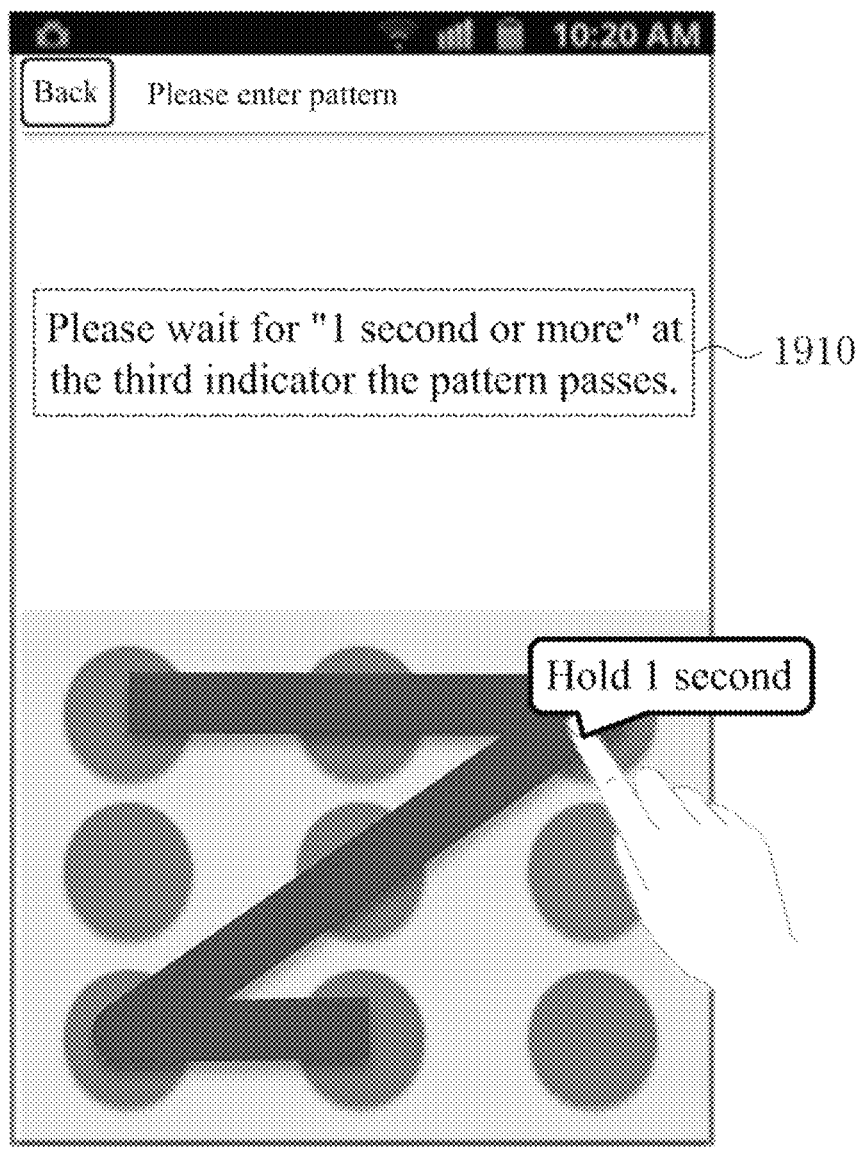
FIG. 19 illustrates another example of a process of authenticating a user using a touch time delay according to one embodiment.

FIG. 19 illustrates another example of a process of authenticating a user using a touch time delay according to another embodiment. A fourth screen 1900 illustrates an example of a touchscreen on which nine indicators are displayed as a user interface for inputting a pattern. Here, an example of information for requesting a user to maintain an input of a touch on a partial pattern for a preset period of time or more with the pattern is displayed on a fourth box 1910 indicated with dotted lines. The user may input a pattern associated with a third indicator and the touch action together by maintaining the touch for 1 second or more at a time of inputting the pattern associated with the third indicator. Even in this case, if the touch action is preset as the password of the user with the pattern, separate request information may not be displayed.

Also, the preset touch action may include an action of changing an input rate of the selected partial number or an input rate of the selected partial pattern.

Figure 20:
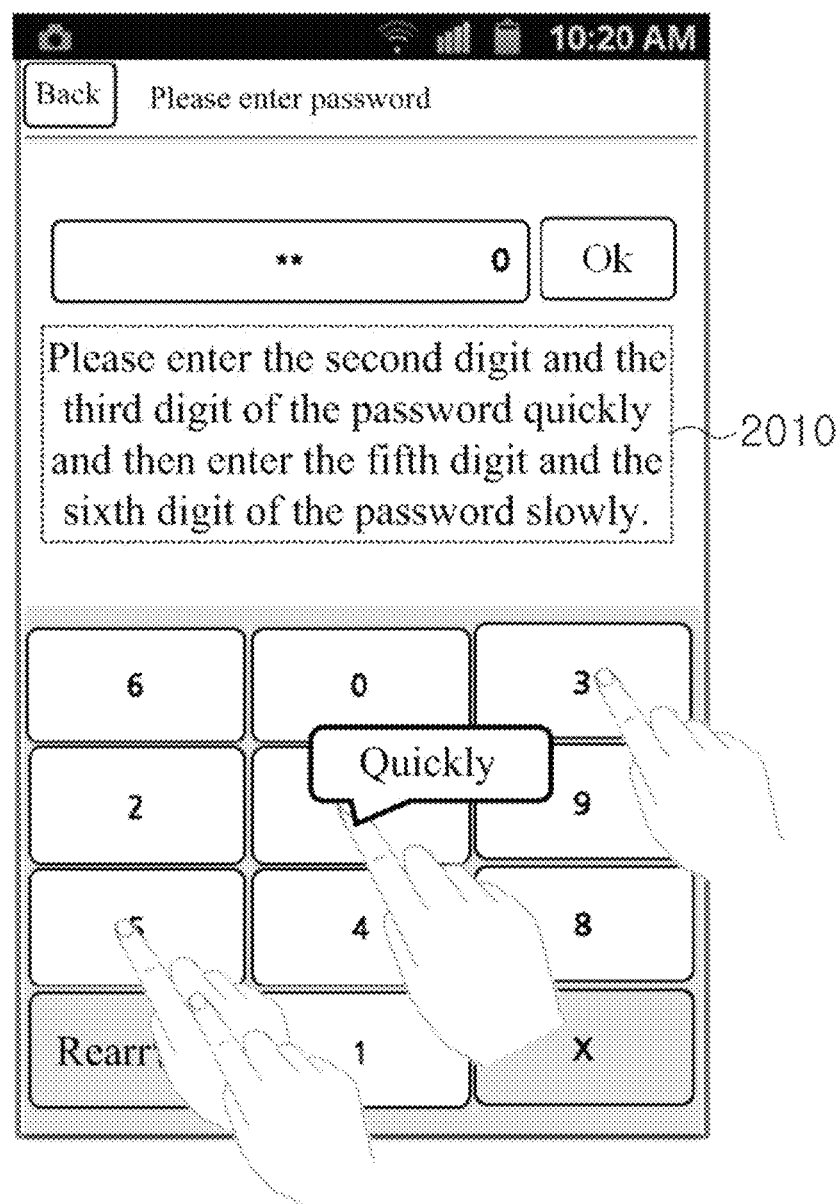
FIG. 20 illustrates an example of a process of authenticating a user using a change in a touch input rate according to one embodiment.

FIG. 20 illustrates an example of a process of authenticating a user using a change in a touch input rate according to one embodiment. A fifth screen 2000 illustrates an example of a touchscreen on which a user interface for inputting a password is displayed while requesting a user to input the password. Here, an example of information for requesting the user to change the input rates of the partial numbers of the password is displayed in a fifth box 2010 indicated with dotted lines. The user may input the password and a touch action by relatively quickly inputting a second digit and a third digit of the password compared to other digits of the password, and by relatively slowly inputting a fifth digit and a sixth digit of the password. If the touch action is preset as the password of the user with the password, separate request information may not be displayed.

Figure 21:
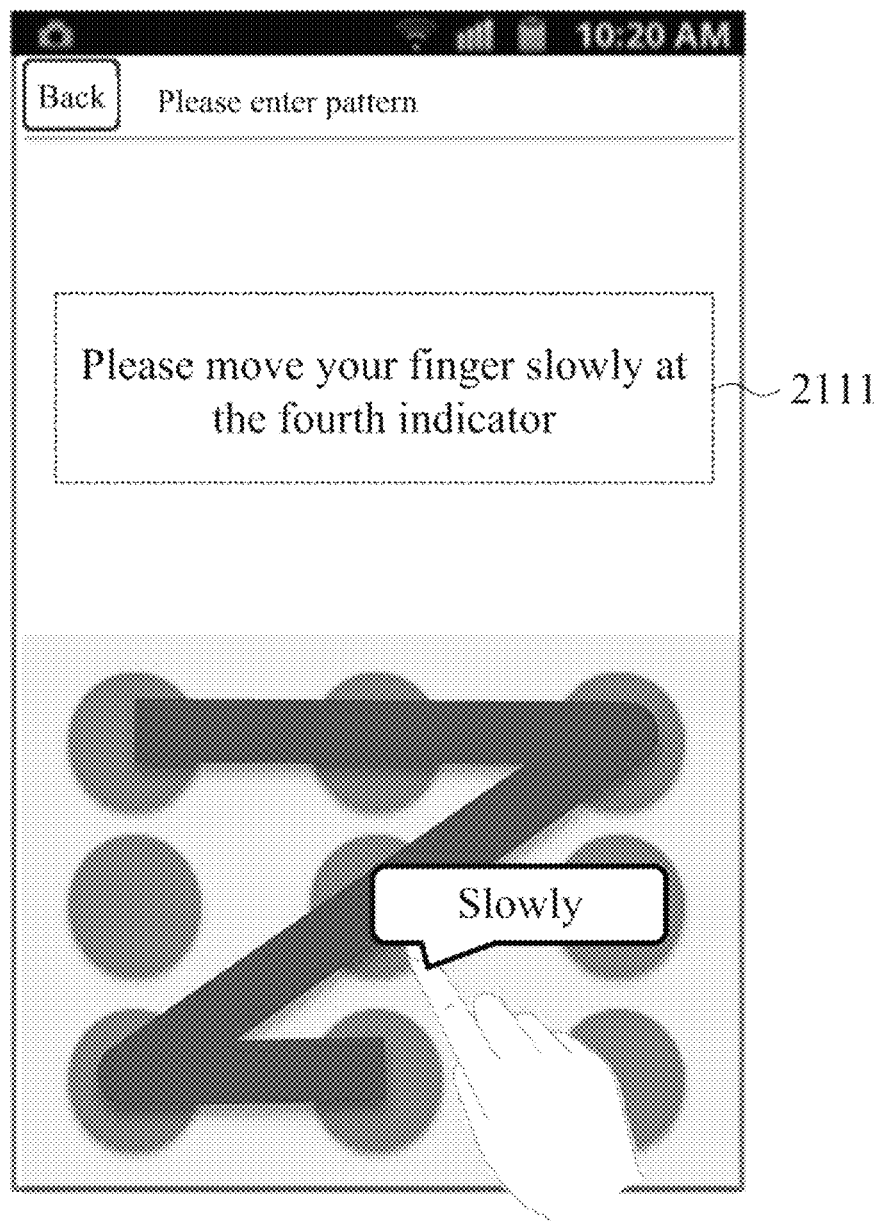
FIG. 21 illustrates another example of a process of authenticating a user using a change in a touch input rate according to one embodiment.

FIG. 21 illustrates another example of a process of authenticating a user using a change in a touch input rate according to one embodiment. A sixth screen 2100 illustrates an example of a touchscreen on which nine indicators are displayed as a user interface for inputting a pattern while requesting a user to input the pattern. Here, an example of information for requesting the user to change an input rate of a pattern associated with a specific indicator with the pattern is displayed in a sixth box 2110 indicated with dotted lines. The user may input the pattern and the touch action together by relatively slowly moving a finger at a time of inputting the pattern in association with a fourth indicator. Even in this case, if the touch action is preset as the password of the user with the pattern, separate request information may not be displayed.

Figure 22:
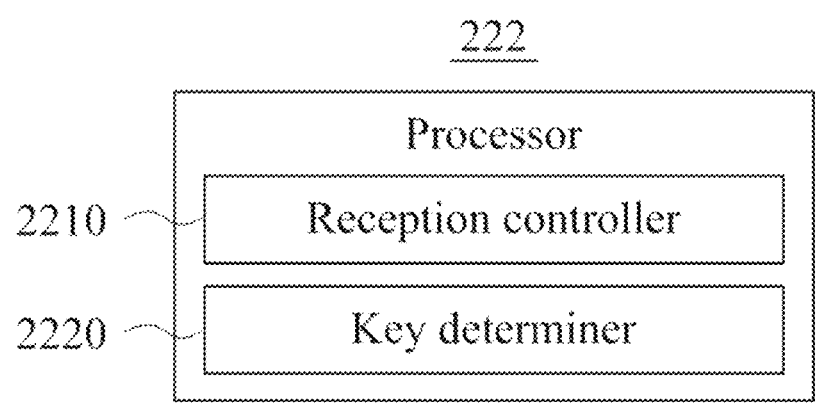
FIG. 22 is a block diagram illustrating components includable in a processor of a server according to one embodiment.
Figure 23:
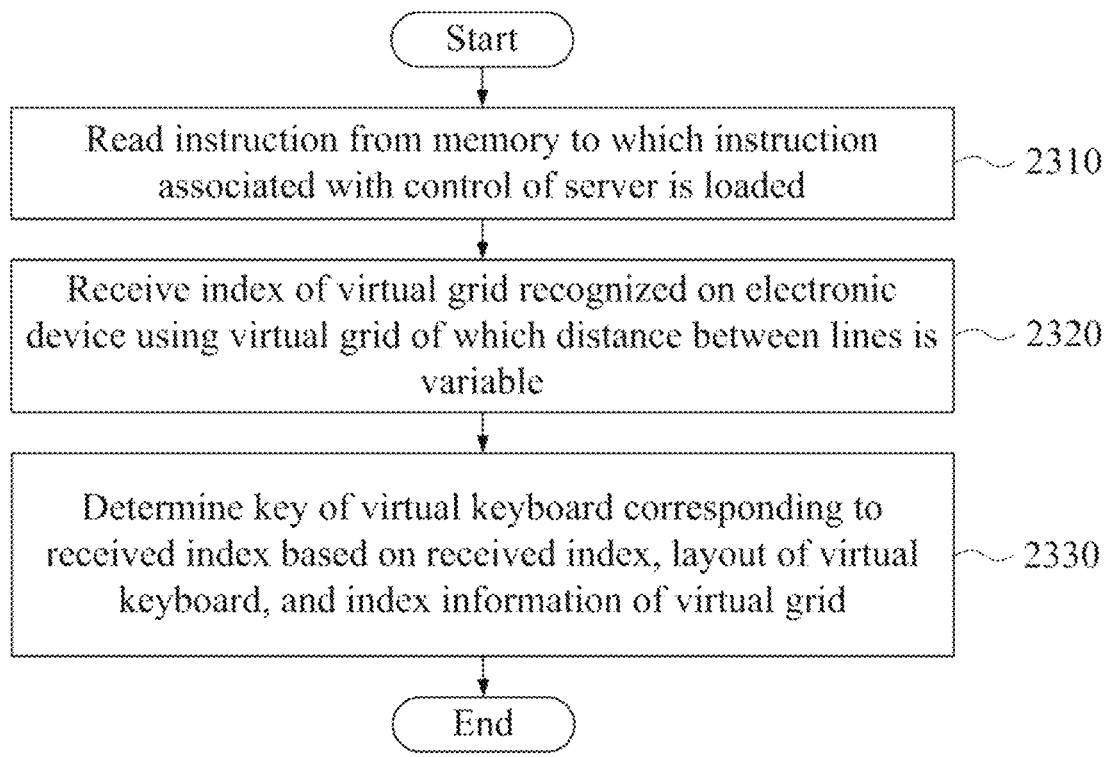
FIG. 23 is a flowchart illustrating a method performed by a server according to one embodiment.

FIG. 22 is a block diagram illustrating an example of components includable in the processor 222 of the server 150 according to one embodiment, and FIG. 23 is a flowchart illustrating a method performed by the server 150 according to one embodiment.

The server 150 may implement an input recognition system according to an example embodiment. Referring to FIG. 22, the processor 222 of the server 150 may include a reception controller 2210 and a key determiner 2220 as components. The processor 222 and the components of the processor 222 may control the server 150 to perform operations 2310 through 2330 included in an input recognition method of FIG. 23. Here, the processor 222 and the components of the processor 222 may be configured to execute instructions according to a code of at least one program and a code of an OS included in the memory 221. Here, the components of the processor 222 may be representations of different functions performed by the processor 222 in response to a control instruction provided from the program code stored in the server 150. For example, the reception controller 2210 may be used as a functional representation of the processor 222 that controls the server 150 to receive an index of a virtual grid in response to the control instruction.

Referring to FIG. 23, in operation 2310, the processor 222 may read, from the memory 221 to which an instruction associated with control of the server 150 is loaded, the instruction. In this case, the received instruction may include at least a portion of an instruction to control the processor 222 to perform the following operations 2320 and 2330.

In operation 2320, the reception controller 2210 may receive an index of a virtual grid recognized on the electronic device 110 using the virtual grid of which a distance between lines is variable, over the network 170. Here, the virtual grid may correspond to a region of a virtual keyboard displayed on a display of the electronic device 110.

In operation 2330, the key determiner 2220 may determine a key of the virtual keyboard corresponding to the received index based on the received index, a layout of the virtual keyboard, and index information of the virtual grid. Here, as described above, the index information of the virtual grid may include at least one of information about the distance between the lines of the virtual grid and information about locations of the lines of the virtual grid.

The virtual grid may be maintained for a single input session and the virtual grid of which the distance between the lines is changed may be generated on the electronic device 110 per different input session.

Specific operations for authenticating the user may be performed by the processor 222 of the server 150 as follows. The processor 222 may control the server 150 to store a password or a pattern set by a user of the electronic device, select a partial number or a partial pattern of the password or the pattern, transmit, to the electronic device over the network, information for requesting an input of a preset touch action at a time of inputting the selected partial number or partial pattern, receive the password and the touch action or the pattern and the touch action that are recognized on the electronic device and authenticate the user in response to the recognized password or pattern matching the password or the pattern set by the user and the touch action recognized at a time of inputting the selected partial number or partial pattern matching the preset touch action.

According to other example embodiments, the processor 222 may control the server 150 to mutually associate and store a password and a touch action or a pattern and a touch action that are set by a user of the electronic device. Here, the touch action comprises a preset touch action recognized for a partial number or a partial pattern of the password or the pattern while receiving the password or the pattern from the user on the electronic device.

Description not made in FIGS. 22 and 23 may refer to the description made above with reference to FIGS. 1 through 21.

As described above, according to example embodiments, it is possible to recognize a location selected by a user using an index of a virtual grid of which a distance between lines is variable as coordinates, instead of using coordinates of a coordinate system used on an electronic device and thereby prevent the location selected by the user from being inferred, and it is possible to generate the virtual grid by changing the distance between the lines of the virtual grid per input session and to recognize a different index of the virtual grid even with respect to the same location selected by the user. Also, it is possible to include a preset touch pattern in a portion of a password or a pattern input from the user and to authenticate the user in response to a touch pattern associated with a partial number or a partial pattern as well as a touch pattern associated with the password or the pattern of the user obtained based on a location selected by the user matching the preset touch pattern.

The systems or apparatuses described herein may be implemented using hardware components, software components, or a combination thereof. For example, the apparatuses and the components described herein may be implemented using one or more computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical or virtual equipment, or computer storage medium or device capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. The media may continuously store computer-executable programs or temporarily store the same for execution or download. Also, the media may be various recording devices or storage devices in which a single or a plurality of hardware modules are combined. Further, the media may be distributively present on a network without being limited to media directly connected to any computer system. Examples of non-transitory computer-readable media include magnetic media such as hard disks, floppy disks, and magnetic tapes; optical media such as CD-ROM discs, and DVDs; magneto-optical medium such as floptical disks; and hardware devices that are specially configured to store and perform program instructions, such as read-only memory (ROM), random access memory (RAM), flash memory, and the like, and may be configured to store program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An input recognition method performed by a server configured as a computer, the method comprising:
    receiving an index of a currently generated one of a first virtual grid and a second virtual grid corresponding to a first location on a virtual keyboard displayed on an electronic device in communication with the server; and
    determining a key of the virtual keyboard corresponding to the received index based on the received index, a layout of the virtual keyboard, and index information of the first virtual grid or the second virtual grid,
    wherein the first virtual grid is generated on at least a partial region of a display of the electronic device on which the virtual keyboard is displayed and has a predefined size and a predetermined number of first lines separating the first virtual grid into a predetermined number of first locations each identified by a corresponding index;
    the second virtual grid is generated on the at least the partial region of the display on which the virtual keyboard is displayed in place of the first virtual grid after a predefined event, the second virtual grid having a predetermined number of second lines separating the second virtual grid into a predetermined number of second locations each identified by a corresponding index; and wherein the predetermined number of first locations are equal to the predetermined number of second locations, a number of the indices in the first virtual grid are the same as a number of the indices in the second virtual grid, and at least one index in the second virtual grid is located at a different portion of the at least a partial region of the display from the same at least one index in the first virtual grid.

2. The method of claim 1, wherein the first virtual grid is maintained on the partial region of the display for a single input session, and the second virtual grid is generated per different input sessions.

3. The method of claim 1, further comprising:

generating the index information of the first virtual grid and transmitting the generated index information of the first virtual grid to the electronic device over the network, wherein the electronic device is configured to generate the first virtual grid based on the index information of the virtual grid.

4. The method of claim 1, further comprising:

storing a password or a pattern set by a user of the electronic device;

selecting a partial number or a partial pattern of the password or the pattern;

transmitting, to the electronic device over the network, information for requesting an input of a preset touch action at a time of inputting the selected partial number or partial pattern;

receiving the password and the touch action or the pattern and the touch action that are recognized on the electronic device; and authenticating the user in response to the recognized password or pattern matching the password or the pattern set by the user and the touch action recognized at a time of inputting the selected partial number or partial pattern matching the preset touch action.

5. The method of claim 1, further comprising:

mutually associating and storing a password and a touch action or a pattern and a touch action that are set by a user of the electronic device, wherein the touch action comprises a preset touch action recognized for a partial number or a partial pattern of the password or the pattern while receiving the password or the pattern from the user on the electronic device.

6. An input recognition system of a server configured as a computer, the input recognition system comprising:

a memory configured to store computer-readable instructions; and at least one processor configured to execute the instructions, wherein the at least one processor comprises:

a reception controller configured to receive an index of a currently generated one of a first virtual grid and a second virtual grid corresponding to a first location on a virtual keyboard displayed on an electronic device in communication with the server over a network; and a key determiner configured to determine a key of the virtual keyboard corresponding to the received index based on the received index, a layout of the virtual keyboard, and index information of the first virtual grid or the second virtual grid, wherein the first virtual grid is generated on at least a partial region of a display of the electronic device on which the virtual keyboard is displayed and has a predefined size and a predetermined number of first lines separating the first virtual grid into a predetermined number of first locations each identified by a corresponding index;

the second virtual grid is generated on the at least the partial region of the display on which the virtual keyboard is displayed in place of the first virtual grid after a predefined event, the second virtual grid having a predetermined number of second lines separating the second virtual grid into a predetermined number of second locations each identified by a corresponding index; and wherein the predetermined number of first locations are equal to the predetermined number of second locations, a number of the indices in the first virtual grid are the same as a number of the indices in the second virtual grid, and at least one index in the second virtual grid is located at a different portion of the at least a partial region of the display from the same at least one index in the first virtual grid.

7. The input recognition system of claim 6 wherein the first virtual grid is maintained on the partial region of the display for a single input session, and the second virtual grid is generated per different input sessions.

* * * * *